United States Patent [19]
Sicking et al.

[11] Patent Number: 5,513,150
[45] Date of Patent: Apr. 30, 1996

[54] METHOD OF DETERMINING 3-D ACOUSTIC VELOCITIES FOR SEISMIC SURVEYS

[75] Inventors: Charles J. Sicking; Bruce S. Campbell, both of Plano, Tex.

[73] Assignee: Atlantic Richfield Company, Los Angeles, Calif.

[21] Appl. No.: 85,440

[22] Filed: Jun. 30, 1993

[51] Int. Cl.$^6$ .............................. G01V 1/28; G01V 1/36
[52] U.S. Cl. ................ 367/73; 367/53; 367/72; 364/421
[58] Field of Search ............... 367/21,53,72,73; 364/421

[56] References Cited

U.S. PATENT DOCUMENTS

| | | | |
|---|---|---|---|
| 4,984,220 | 1/1991 | Bodine et al. | 367/68 |
| 4,992,996 | 2/1991 | Wang et al. | 367/53 |
| 5,008,861 | 4/1991 | Gallagher | 367/59 |
| 5,229,940 | 7/1993 | Wang et al. | 364/421 |
| 5,349,527 | 9/1994 | Pieprzak et al. | 364/421 |

OTHER PUBLICATIONS

Wang, Bin; Doctoral Thesis, Purdue University 1993, pp. 1–221; Abst. only herewith.
Unger, J. D.; Geobyte, vol. 3, pp. 42–50, 52–54, Aug. 1988; Abst. only herewith.
Carter, et al., "North Sea velocity correction techniques", *Oil & Gas Journal* (Oct. 24, 1988), pp. 81–84.
Tegland, "Computer–Assisted Interpretation of Seismic Structure and Velocity Data", presented at 42nd annual meeting of Society of Exploration Geophysics (1972).

Primary Examiner—Nelson Moskowitz
Attorney, Agent, or Firm—Rodney M. Anderson

[57] ABSTRACT

A method of producing a velocity volume for a seismic survey volume, based on two-way time seismic data and process velocity data, is disclosed. Two-way time seismic data is loaded into a computer for a plurality of seismic shot lines in the survey region, as are process velocities for common depth points (CDPs) in the survey region. The process velocities correspond to velocities used to perform normal move-out, dip move-out, migration and other imaging processes. The computer can display the two-way time information in cross-section or map views, and can display the velocity functions as a function of two-way time. The human analyst enters interpreted velocities, based on actual data or on visualization of the horizons, into the cross-sectional view of the seismic shot line, and then edits the input velocity data to produce a velocity function, for each CDP of interest, that matches the interpreted values. Repeating this process for each of the seismic shot lines, and for as many CDPs as desired, produces a velocity volume model more suitable for use in time-to-depth conversion.

18 Claims, 9 Drawing Sheets

EDIT HORIZON CONFIRMATION

| Horizon Name | Min Time | Max Time |
|---|---|---|
| HORIZON-A | 295 | 3510 |
| HORIZON-B | 369 | 4200 |
| HORIZON-C | 622 | 4438 |
| HORIZON-D | 884 | 4664 |
| HORIZON-E | 273 | 5360 |
| HORIZON-F | 1191 | 5753 |

Help

TWO WAY TIME (ms) FOR NEW HORIZON
[ 0 ]

NEW HORIZON NAME
[          ]

[ ADD HORIZON ]

HORIZON NAME TO DELETE
[          ]

[ DELETE HORIZON ]

HORIZON NAME TO MOVE
[          ]

NEW HORIZON POSITION
[ 0 ]

[ MOVE HORIZON ]

[ REMOVE THIS BOX ]

METHOD OF DETERMINING 3-D ACOUSTIC VELOCITIES FOR SEISMIC SURVEYS

This invention is in the field of oil and gas exploration, and is more specifically directed to the analysis of seismic and physical data in determining acoustic velocities at regions below the surface of the earth.

BACKGROUND OF THE INVENTION

In the field of the interpretation of seismic data obtained for purposes of oil and gas exploration, one of the more important parameters to be determined is propagation velocity of acoustic energy through sub-surface rock. One may identify the lithology of a sub-surface layer by knowledge of its interval velocity, where interval velocity refers to the acoustic propagation velocity within a given sub-surface layer, region or stratum. Furthermore, knowledge of the interval velocity for a hydrocarbon bearing region can assist in predicting the geopressure therein.

As is well known in the art, the interval velocities of sub-surface strata are essential in determining the depths of acoustic reflectors from the two-way times of acoustic waves generated and sensed in conventional seismic prospecting. Accordingly, the accuracy with which interval velocities may be determined within a survey volume will determine the accuracy with which the depths of the sub-surface geological features can be determined in the survey.

Data from which interval velocities are determined can be provided by several conventional sources. Actual velocities for particular sample locations may be obtained by core sampling or by conventional well logging. While the velocity information obtained by sampling and logging is quite accurate, the volume over which the velocity information is valid is necessarily quite small, however.

Modern seismic survey data processing techniques are now also used to determine certain velocity parameters that are often referred to as "process" velocities, from which interval velocities may be deduced. One process velocity is the so-called "stack" velocity that may be derived from 2-D seismic data using the well-known techniques of constant velocity gather ("CGP") and constant velocity stack ("CVS"). The CGP and CVS processes each perform normal move-out ("NMO") for a set of 2-D seismic data over iterations of an assumed constant velocity; the closest stack velocity to the actual velocity is presumed to be that which results in the most realistic reflection artifact. Another well-known process velocity is the dip move-out ("DMO") velocity, which is used to correct for the angle of dip of a sub-surface reflector. Conventional migration techniques also produce a migration velocity, which is another type of process velocity, which is based upon the assumed location of equal velocity lines below the surface and above the reflector being migrated.

Each of these process velocities, as well as those obtained from core sampling and logging, are used to estimate interval velocities for a number of surface locations using the well-known Dix equation. While this approach results in a calculated interval velocity, both the process velocity values and the Dix equation itself are based upon assumptions about the sub-surface geology. These assumptions may not be valid for the actual survey volume, however, due to differences between the assumptions and the actual geology which manifest themselves as anomalies or artifacts in the interval velocity model for the survey. Examples of physical causes of these artifacts include those well-known problems due to near-surface layers, such as permafrost; near-surface layers of high velocity and significant thickness variation can especially causes problems in the stacking of seismic data.

Furthermore, considering that process velocity values are generally optimized to provide the best image of a reflector in the seismic data rather than the most accurate representation of the actual acoustic velocity in the earth, use of process velocities in performing time-to-depth conversion of seismic data is vulnerable to error.

According to prior data processing techniques, anomalies and artifacts in the calculated interval velocity volume have been dealt with by numerically smoothing the measured velocities prior to their conversion to interval velocities by way of the Dix equation. It has been observed, however, that the resulting interval velocity volume remains inaccurate relative to the actual geology, however, as this prior method merely distributes (or "smears out") the anomalies over a larger volume rather than removing them from the model.

By way of further background, an approach for performing time-to-depth conversion using seismic velocities is described in Carter, et al., "North Sea velocity correction techniques", *Oil & Gas Journal* (Oct. 24, 1988), pp. 81–84. According to this approach, velocities are manually repicked for selected horizons. However, this repicking is extremely cumbersome and requires a large amount of manual labor. Furthermore, as described in the article, these repicked velocities are numerically smoothed, and accordingly any velocity anomalies that may be present are not removed.

Prior data processing techniques have also included the use of supercomputers to iteratively perform depth migration, by way of an inversion, over a survey volume based on multiple 2-D survey lines. It has been observed, however, that this iterative inversion process not only requires large amounts of supercomputer time (with costs of on the order of tens of thousands of dollars of computer time for each survey line), but also still requires a great deal of interpretation by a human expert between inversions to arrive at a usable result.

By way of further background, the GEOQUEST, LANDMARK and CHARISMA seismic data interpretation systems are known to provide graphical display of cross-sections of seismic data with common-depth point (CDP) on the horizontal axis and two-way time on the vertical axis. In such cross-section displays, these systems "post" two-way time information from seismic lines that cross the displayed line.

It is therefore an object of the present invention to provide a method of determining a velocity model for a survey volume which more accurately utilizes velocity data from multiple sources.

It is a further object of the present invention to provide such a method where the modeled velocities may be interval velocity or may be root-mean-square velocity.

It is a further object of the present invention to provide such a method which operates in an interactive manner with a human analyst.

It is a further object of the present invention to provide such a method which allows the human analyst to locate and remove anomalous information from the interval velocity survey volume.

It is a further object of the present invention to provide such a method which allows the human analyst to incorporate velocity data from dissimilar sources, such as well logs, core samples and the like into the process velocity model to arrive at the interval velocity volume.

It is a further object of the present invention to provide such a method which can receive processing velocities from a number of conventional sources.

It is a further object of the present invention to provide such a method which can present its output to conventional time-to-depth conversion programs.

It is a further object of the present invention to provide such a method having the capability of subsequent updating of velocity data or new seismic lines to provide an upgraded velocity volume.

Other objects and advantages of the present invention will be apparent to those of ordinary skill in the art having reference to the following specification together with the drawings.

SUMMARY OF THE INVENTION

The invention may be implemented into a computer program that may be run on conventional desktop workstations. Interpreted two-way time information from multiple 2-D lines are read into the system, along with process velocities determined from NMO, migration and other processes. The system provides a volume interpretation of the root-mean-square velocities based on this information, and allows for display in map or cross-section orientation. For each seismic line, the human analyst edits the interpretation by editing the velocity function (velocity versus two-way time) at selected control locations; data from core samples, well logs, or check shots may be used in this editing. As a result, a root-mean-square velocity volume is produced which has coherence among seismic lines, and also relative to the extrinsic velocity data. Based on this edited interpretation, the system provides an interval velocity interpretation which can similarly be edited by the human analyst. Upon completion of the process, the velocity volume (either root-mean-square or interval velocity) is suitable for presentation to a conventional time-to-depth conversion routine, thus providing a coherent and accurate geologic model.

DETAILED DESCRIPTION OF THE PREFERRED EMBODIMENT

Figure 1:
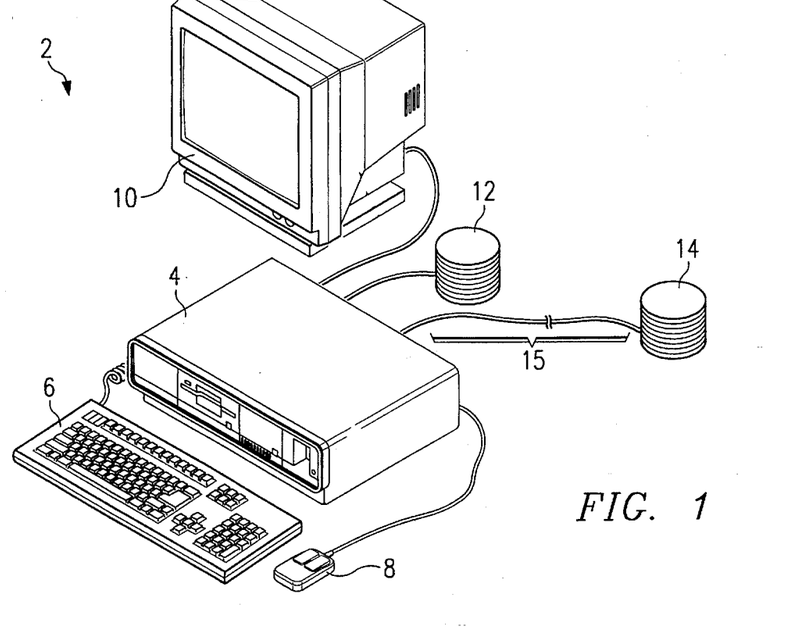
FIG. 1 is an electrical diagram, in block form, of a computer system incorporating the present invention.

Referring first to FIG. 1, an overview of computer system 2 capable of performing the present invention according to its preferred embodiment will be briefly described. It is contemplated that computer system 2 will have computing power and speed on the order of modern desktop workstations, such as the SYSTEM EXPANSION workstation available from Digital Equipment Corporation, the SPARCSTATION workstation available from Sun Microsystems, Inc., and the R6000 workstation available from IBM Corporation.

Computer system 2, as is conventional in the art for workstations, includes CPU 4 which performs the data processing operations described hereinbelow. CPU 4 interfaces with a human analyst or user via conventional input/output devices, such as keyboard 6, mouse 8 and graphics display 10. For best resolution and results, it is preferred that graphics display 10 be of the type having high resolution color display, with a high number of displayable colors; an example of a suitable model for graphics display 10 is the model VRT19-DA graphics display monitor available from Digital Equipment Corporation. CPU 4 also preferably includes local disk storage 12 for the storage of program and data information, and also preferably can access remote disk storage 14 by way of a local-area or wide-area network 16, in the conventional manner.

For ease of display and editing, it is preferred that computer system 2 operate in a windowing environment, enabling the human analyst to open various "windows" for display during the operation of the system. In addition, as is well known in the art, it is preferred that data entry and other file management operations be performed by way of pull-down menus, radio buttons, and other similar features common to windowing environments. A preferred operating system for computer system 2 according to the preferred embodiment of the invention is the UNIX operating system, and the preferred windowing environment is the X/MOTIF windowing environment.

It is contemplated that one of ordinary skill in the art will be capable of programming such a digital computer in the appropriate manner to perform the functions described hereinbelow without undue experimentation. It is preferred that such programming be done in a high-level language, such as C, and then compiled for installation on the workstations for the various users of this method, as is conventional in the art.

Figure 2:
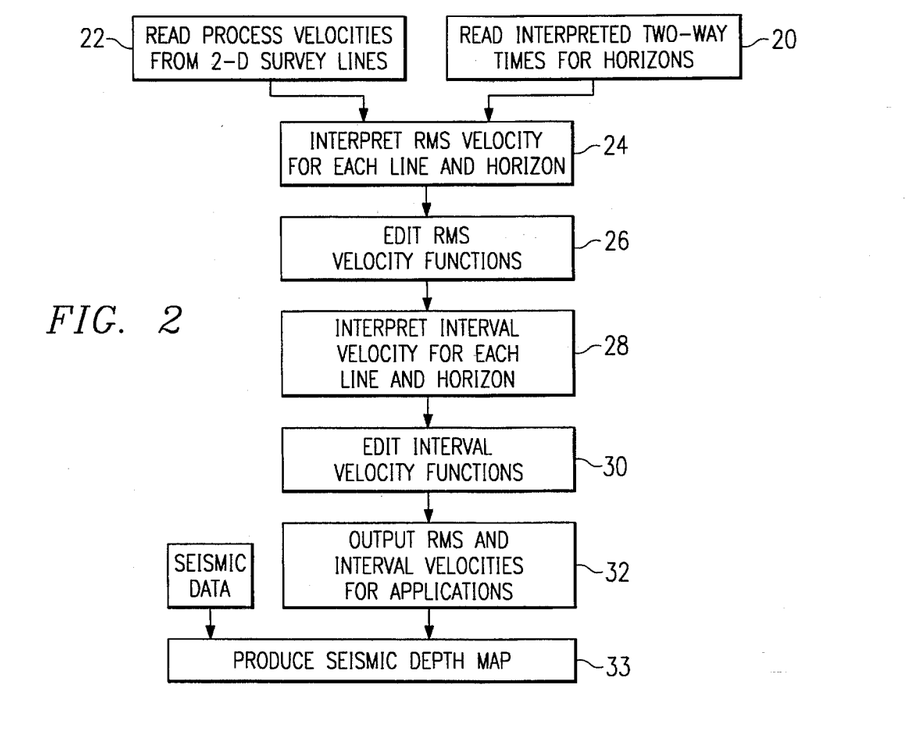
FIG. 2 is a flow diagram illustrating the operation of the preferred embodiment of the invention.

FIG. 2 illustrates, in flow chart form, the overall method of obtaining a three-dimensional velocity model according to the preferred embodiment of the invention. According to the preferred embodiment of the invention, the method begins with processes 20, 22, each of which input data into the interactive interpretation routine of the preferred embodiment of the invention. Process 20 reads into computer system 2 (i.e., into disk or random access memory for later access in the method of FIG. 2) digital data representative of multiple interpreted two-way time horizons, such digital data in the format conventionally presented by the GEOQUEST, CHARISMA AND LANDMARK seismic data processing interpretation systems. For example, horizon data from these conventional systems are generally in an ASCII format, and thus can be read in process 20 by way of conventional methods. Process 22 reads into computer system 2 digital data that is representative of stacking and other process velocities (e.g., DMO velocity, migration velocity) as a function of two-way time. These velocity data are obtained in the conventional manner, such as from a seismic data processing system using a conventional velocity analysis program.

Figure 3:
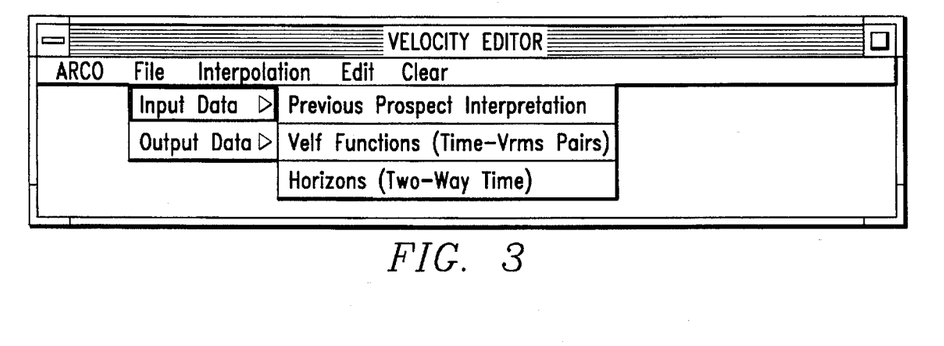
FIGS. 3 and 4 are illustrations of display windows for entering data according to the preferred embodiment of the invention.

Referring now to FIG. 3, a display window from monitor 10 is illustrated by way of which the input processes 20, 22 may be performed by a human analyst. As shown in FIG. 3, menu bar 30 includes various cascade or pull-down selections, including, in this example, "ARCO" (for operating functions, such as selection of graphics utilities and exit from the program). The "File" menu bar selection allows the human analyst to select between "Input Data" and "Output Data", as shown in FIG. 3. The menu bar of FIG. 3 illustrates the options provided when the button "Input Data" is selected, such options including the input of previous prospect interpretation (as will be described in further detail hereinbelow), the input of velocity functions (Velf) in process 22, and the input of two-way time horizons in process 20.

Figure 4:
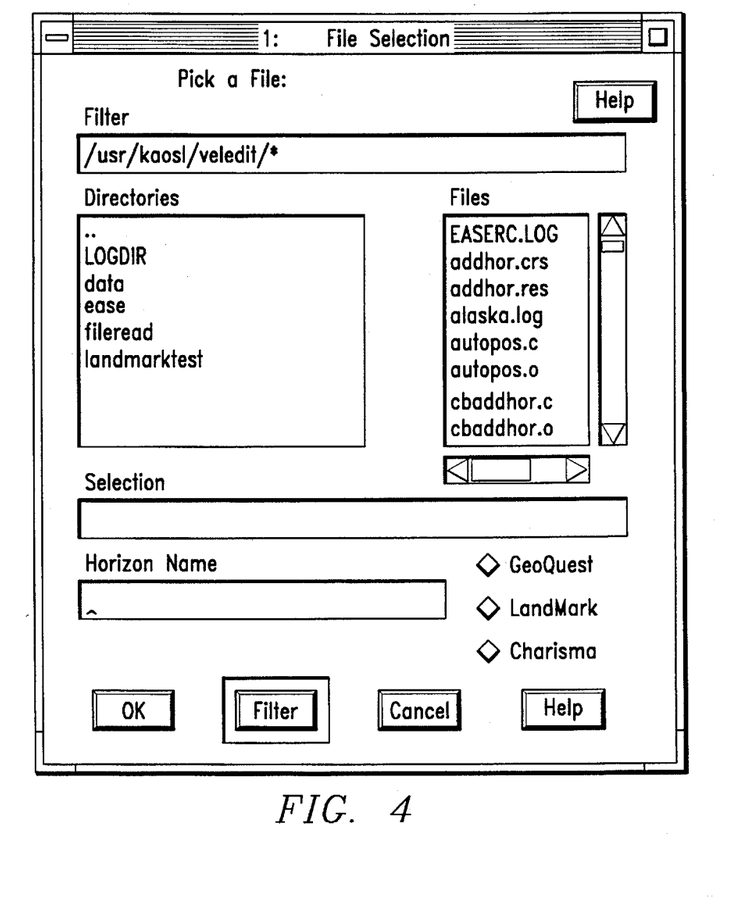

FIG. 4 illustrates the input display window for process 20, in which interpreted two-way time horizons are entered into computer system 2 according to the preferred embodiment of the invention. The window of FIG. 4 appears responsive to the human analyst selecting the "Horizons (Two-Way Time)" button in the cascade buttons of FIG. 3. As evident from FIG. 4, computer system 2 provides the ability to select files from disk storage 12 or remote disk storage 14; these horizon files may be in any of several conventional formats generated from conventional two-way time interpretation programs (i.e., GEOQUEST, LANDMARK or CHARISMA, in this example). The display box labeled "Filter" specifies the selected directory in which the current files in the "Files" box are located; clicking on a different directory in the "Directories" box will select a different directory to be displayed in the "Filter" box.

Figure 5:
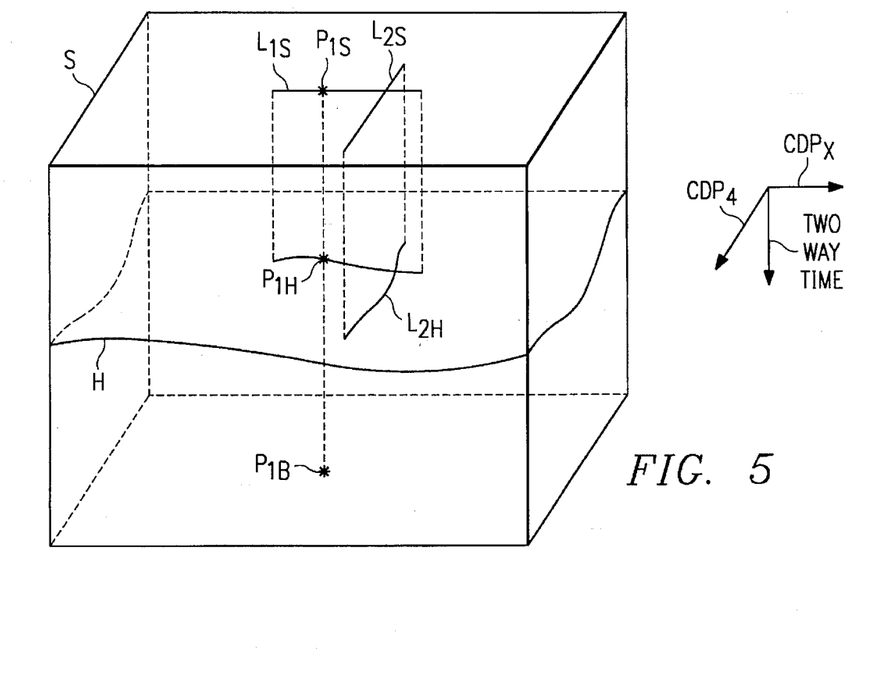
FIG. 5 is a schematic illustration of the survey volume applied to the preferred embodiment of the invention.

According to this embodiment of the invention, each input horizon file read in process 20 contains stacked or migrated 2-D seismic times corresponding to a single horizon with multiple seismic lines. Referring now to FIG. 5, a model volume V is illustrated in time-distance space as generally interpreted by conventional two-way time interpretation programs. Volume V has its horizontal axes corresponding to position (common-depth points, in this case), and a vertical axis corresponding to two-way time. Of course, since two-way time in the seismic field corresponds to depth in the earth (depending upon the velocities), volume V of FIG. 5 corresponds to a modeled volume of the earth.

Exemplary volume V of FIG. 5 includes an planar upper surface S corresponding to the surface of the earth at which the seismic data is generated along a pair of seismic lines $L_{1S}$, $L_{2S}$, planar bottom surface B, and intermediate surface H (which is not necessarily planar) that corresponds to a geologic feature within volume V, and which is referred to herein as horizon H. As illustrated in FIG. 5, the two-way time information from each of seismic lines $L_{1S}$, $L_{2S}$ map to locations in horizon H, such mapping illustrated by lines $L_{1H}$, $L_{2H}$ along horizon H.

Referring back to process 20 and FIG. 4, each file read into computer system in process 20 corresponds to a single horizon such as horizon H, and includes the two-way time information corresponding to multiple seismic lines such as $L_1$, $L_2$. As such, the position and two-way times of mapped interpreted seismic lines $L_{1H}$, $L_{2H}$ of FIG. 5 would be included in the file for horizon H.

Figure 6:
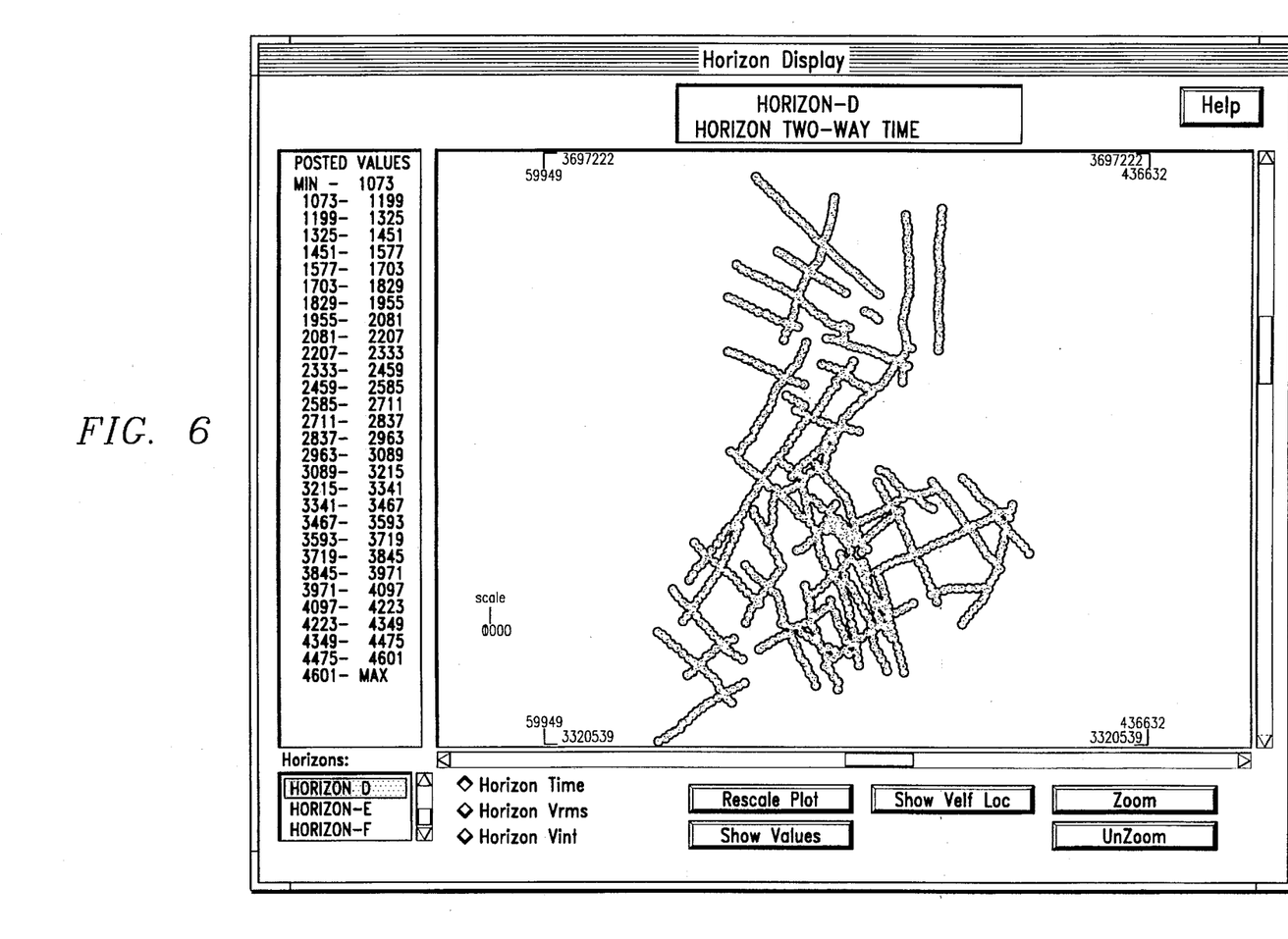
FIG. 6 is an illustration of a map view display of a survey in an example of the preferred embodiment of the invention.

For surveys of reasonable size, it is contemplated that the entire set of two-way time data entered via process 20 will correspond to multiple horizons, each of which have multiple lines of common depth points (CDPs). FIG. 6 illustrates a map view of one horizon for a typical survey; this horizon is named "HORIZON-D", and has been interpreted to correspond to a geologic layer in the earth. According to the preferred embodiment of the invention, each line illustrated in the map view of a horizon also includes an indication of the interpreted two-way time at each CDP by color (not apparent from the black-and-white representation of FIG. 6). The left-hand side of the display window provides a color key for the two-way times (in msec) displayed for the horizon, so that the human analyst is able to obtain a sense of the topology of the displayed horizon in two-way time space.

Figure 7:
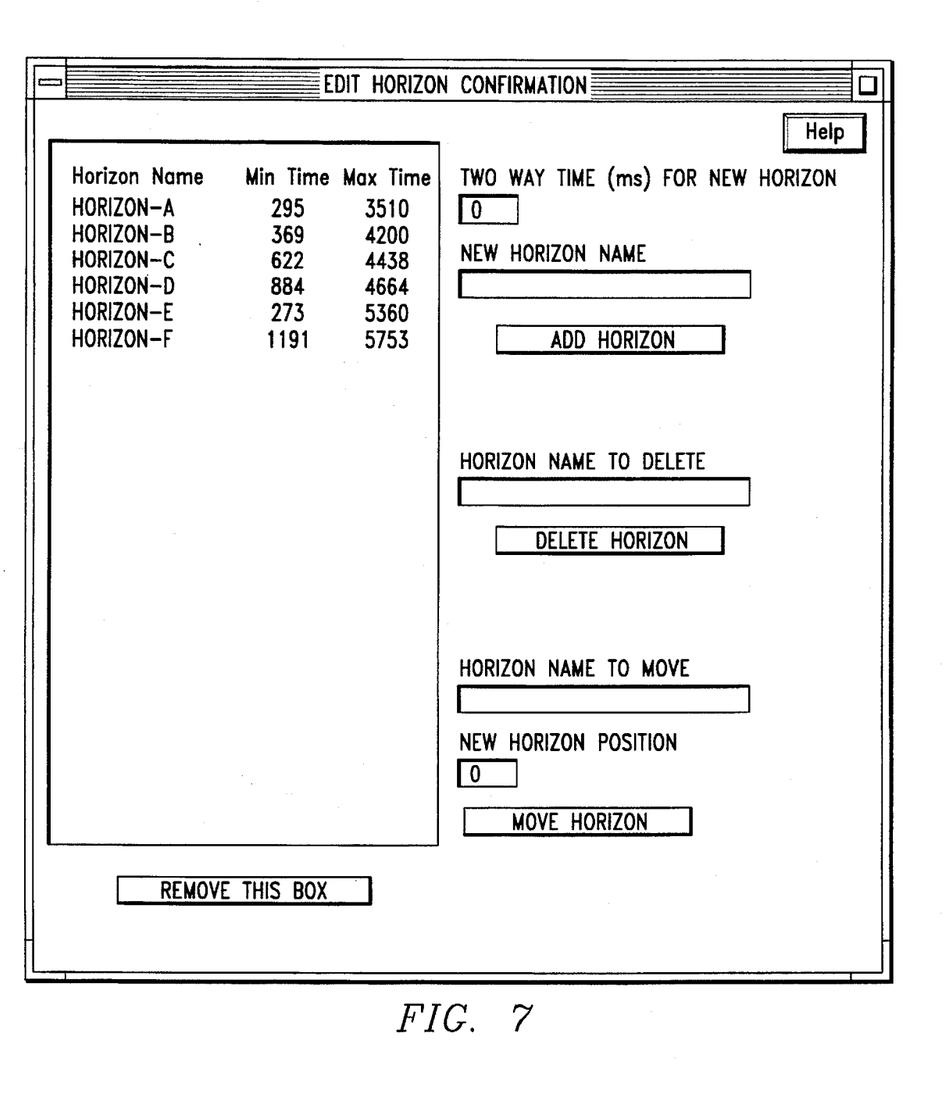
FIG. 7 is an illustration of a display window for configuring horizons in the seismic data according to the preferred embodiment of the invention.

It is preferred that the horizons read via process 2 be ordered according to their two-way times, for example in order of increasing depth (i.e., in order of increasing two-way times). In addition, the human analyst may wish to enter additional "flat" horizons at sparse locations of volume V. Referring to FIG. 7, a display window is illustrated for reconfiguring the horizons entered in process 20, and for adding additional horizons. As is evident from the window of FIG. 7, horizons in the list (displayed with their minimum and maximum two-way times, in msec) may be deleted from or moved within the sequence by way of the boxes in the right-hand side of the window. In addition, horizons may be added by specifying a file name in the "New Horizon Name" field of the window of FIG. 7.

Upon completion of process 20, it is preferred that the human analyst view each horizon in map view (as in FIG. 6) and in cross-section view (as will be described hereinbelow), as a consistency check.

Referring back to FIGS. 2 and 4, process 22 is initiated by selection of the "$V_{elf}$ functions (Time-Vrms Pairs)" button Similarly as in the case of process 20, selected files in disk storage 12 or remote disk storage 14 are read in process 22, such files containing process velocity points at locations within volume V. Referring again to FIG. 5, an example of such a location having velocity versus time values is illustrated. Point $P_{1s}$ corresponds to a CDP in seismic line $L_{1s}$ at surface S, and which maps to points at the same x-y position at varying two-way times. For example, point $P_{1H}$ is located along line $L_{1H}$ in horizon H, and is directly below point $P_{1s}$ along the vertical two-way time axis. Each Velf (velocity function) file read in process 22 corresponds to one or more points P, and contains the process velocity values at selected two-way times. As such, each point P is associated with a set of ordered points, and thus from which one can express process velocity as a function of two-way time.

As discussed above, conventional process velocities, such as NMO velocity, stacking velocity, DMO velocity and migration velocity, are interpreted velocities based upon the raw seismic data, and also based upon certain assumptions regarding the geology and the survey system. Accordingly, as will be described hereinbelow, the method according to the preferred embodiment of the invention is used to generate a model velocity volume using these process volumes, and using other data sources, to create a coherent velocity volume that will be more accurate in performing the time-to-depth conversion.

Referring back to FIG. 2, after the entry of the two-way time horizons and the process velocity functions in processes 20, 22, the root-mean-square (rms) velocities are interpreted for each line in each horizon of volume V in process 24. Process 24 is performed by the human analyst interactively with computer system 2, using a display of volume V for a seismic line in cross-section mode, displaying each of its horizons.

Figure 8A:
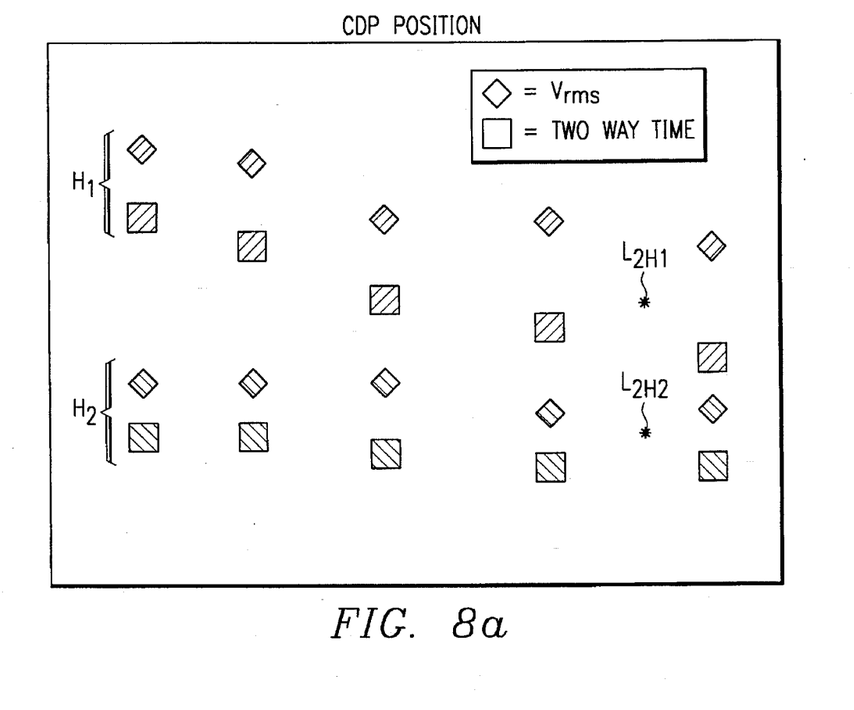
FIGS. 8a through 8c are display illustrations of velocity and two-way time for exemplary horizons of data according to the preferred embodiment of the invention.

Referring now to FIG. 8a, a simplified cross-section display window for two horizons ($H_1$, $H_2$) of seismic line $L_1$ of FIG. 5, is illustrated prior to interpretation in process 24. The window of FIG. 5 has a horizontal axis corresponding to the position of CDPs along seismic line $L_1$; this horizontal axis is not necessarily orthogonal to the sides of volume V of FIG. 5, but will be parallel to the seismic line displayed. Two vertical axes are provided in the view of FIG. 8a, one of which corresponds to the rms velocity and the other of which corresponds to two-way time; as such, each horizon will have two series of values in the display of FIG. 8a, one for velocity and the other for two-way time. In the display of FIG. 8a, the two-way times for each horizon from the data input in process 20 are illustrated by way of solid squares, while the rms process velocities for each horizon are illustrated by way of solid diamonds. For ease of viewing multiple horizons by the human analyst, it is preferred that the different horizons use different colors from one another in displaying the two-way time and rms velocity information, as indicated by the different hatching of these elements in FIG. 8a.

The display of FIG. 8a also shows, by way of asterisks, two-way times from seismic lines crossing the displayed line. Referring back to FIG. 5, seismic line $L_2$ crosses seismic line $L_1$ in this example. As such, the display of FIG. 8a has an asterisk $L_{2H1}$ which illustrates the two-way time at the CDP of seismic line $L_2$ which is collinear with seismic line $L_1$ in horizon $H_1$, and an asterisk $L_{2H2}$ which illustrates the two-way time at the CDP of seismic line $L_2$ which is collinear with seismic line $L_1$ in horizon $H_2$. For best viewing, it is preferred that the asterisks are color-coded according to their appropriate horizons. The display of information from crossing seismic lines is referred to as "posting", and as such asterisks $L_{2H1}$, $L_{2H2}$ have posted their two-way times in the display of horizons $H_1$, $H_2$ of seismic line $L_1$.

Figure 8B:
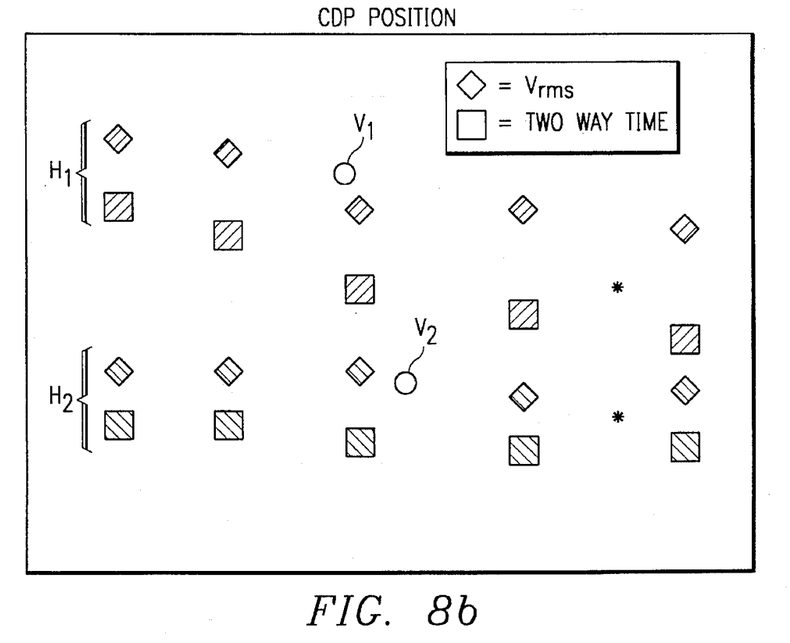

In process 24, the human analyst views the cross-section for a seismic line and interprets the rms velocities for the section. This interpretation may be developed from visualization of the displayed velocities in the cross-section and elsewhere within the volume, such as from neighboring or crossing seismic lines. Alternatively, the human analyst may use information from other sources regarding the actual survey volume, such as from check shots, well logs, or core samples. These interpreted rms velocities are input into the velocity volume model in computer system 2 via the graphical interface of FIG. 8b, for example by moving a cursor to the desired location and clicking a mouse button. The location of interpreted velocities are illustrated in FIG. 8b by the open circles $V_1$, V2, by way of which interpreted velocities for horizons $H_1$, $H_2$ have been entered.

In process 24, such interpreted velocity values are entered for each horizon of each seismic line entered in process 20. Selection of the seismic line for display and entry of the interpreted velocity values is made by way of the appropriate interface features of the windowing environment. As process 24 is performed, it is of course apparent that, for a given seismic line being interpreted, its crossing lines will already have had its interpreted velocities entered. According to the preferred embodiment of the invention, these interpreted velocities will appear as solid circles in the cross-sectional view, color-coded for the appropriate horizons (e.g., as shown by circles $XV_1$, $XV_2$ in FIG. 8c).

Figure 9A:
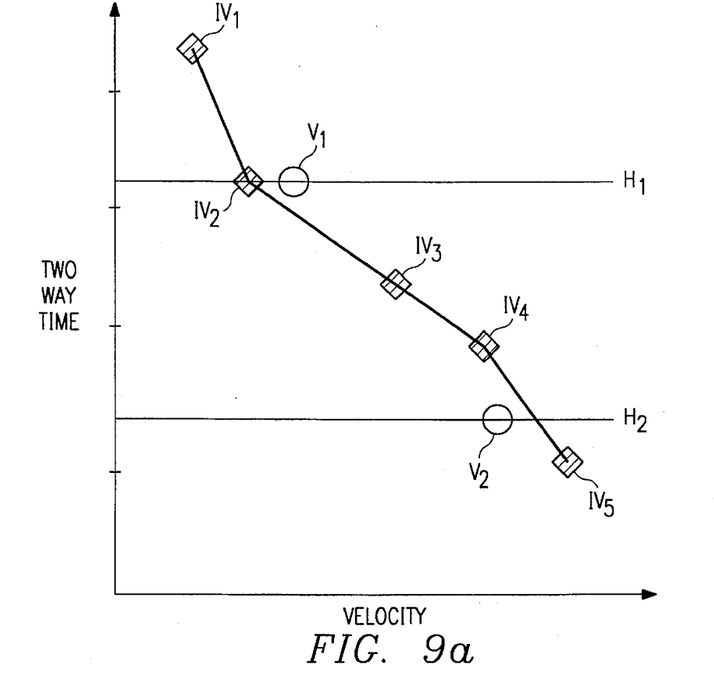
FIGS. 9a, 9b and 10 are illustrations of displayed velocity functions according to the preferred embodiment of the invention.

Upon the appropriate interpretation of velocities performed in process 24, process 26 is now performed, by way of which the rms velocity functions for the CDPs in the survey volume are edited to match the interpreted velocities. Referring now to FIG. 9a, a simplified rms velocity function is illustrated prior to such editing for a selected CDP. As discussed above relative to process 22, multiple paired values of rms process velocity and two-way time are entered for each CDP, based upon which a functional relationship therebetween can be derived. FIG. 9a illustrates the originally input points for a CDP as points $IV_1$ through $IV_5$. For ease of editing, it is preferred that an interpolated line be drawn among the input points $IV_1$ to $IV_5$. In the example of FIG. 9a, a spline interpolation is shown; alternatively, a best fit linear or higher order interpolation may be displayed, as selected by the user.

Also in FIG. 9a, interpreted velocity points $V_1$, $V_2$ from process 22 for the seismic line containing the displayed CDP are illustrated, located at the two-way time values corresponding to horizons $H_1$, $H_2$, respectively. As discussed above, the interpreted velocity points $V_1$, $V_2$ correspond to velocities determined by the human analyst from visualization of the cross-sectional view of the horizons for a seismic line, from extrinsic data such as check shots or well logs, or a combination of these factors. FIG. 9a illustrates that the interpreted velocity points $V_1$, $V_2$ do not necessarily match the function defined by input velocity points $IV_1$ through $IV_5$. This mismatch, resulting from the use of process velocities in the interpretation input to the present method, is addressed in process 26.

Figure 9B:
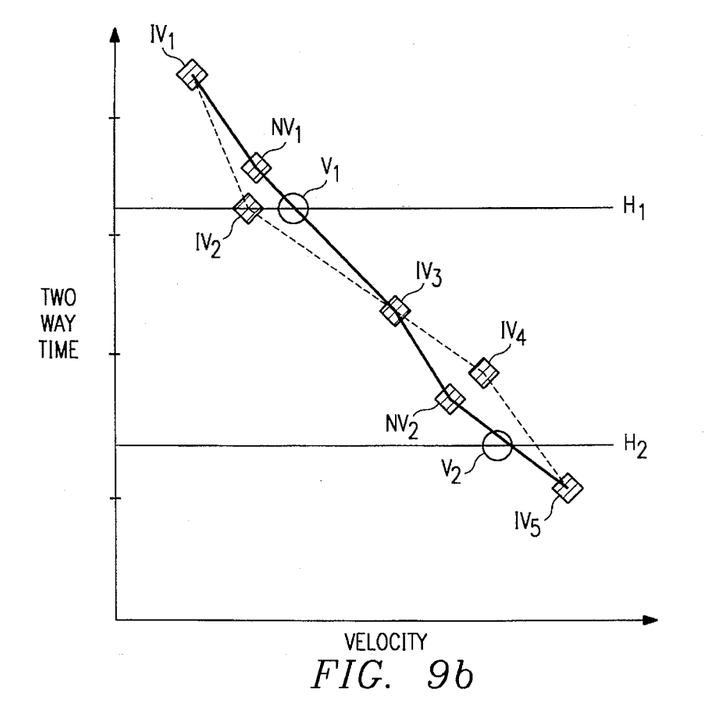

According to the preferred embodiment of the present invention, process 26 enables the human analyst to edit each velocity function by adding and deleting paired values of two-way time and rms velocity so that the interpreted velocity points fit the edited velocity function. As in the case of process 24, this editing is preferably performed by way of moving a cursor to the desired location and clicking a mouse button to move, delete or add a point, as desired. Referring to FIG. 9b, an edited version of the function of FIG. 9a is illustrated, in which input velocity points $IV_2$, $IV_4$ are deleted and in which new velocity points $NV_1$, $NV_2$ are added. As shown in FIG. 9b, the new spline interpolation of the velocity function closely matches the interpreted velocity points $V_1$, $V_2$ at horizons $H_1$, $H_2$, respectively. Upon completion of the editing of the velocity points in the desired manner, the new values are applied to the data by the human analyst clicking on an "apply" button in the display window, for example.

The editing of process 26 is performed for as many CDPs, on as many seismic lines, as deemed useful by the human analyst in matching the velocity functions to the interpreted velocity values. Selection of the CDP to be edited is made by way of the appropriate interface features of the windowing environment. While processes 24, 26 are illustrated as sequential processes, the human analyst may find it useful to return to the cross-section display for a particular line while editing the velocity function, either to view the results for an entire line (and its crossing lines), or to modify an interpreted velocity point. Process 26 thus continues until the edited rms velocity functions reach the desired accuracy relative to the interpreted velocities.

Upon completion of the editing of the rms velocity functions, the velocity functions no longer correspond to the process velocities used in the two-way time interpretation originally entered into computer system 2 in process 22, but instead correspond more closely to the velocities that are necessitated by the data from extrinsic sources (e.g., check shots, well logs, core samples), and for coherence with other seismic lines in the survey area.

Process 28 is then performed, by way of which interval velocities are interpreted for each horizon of each seismic line, in similar manner as the rms velocities are interpreted in process 24. This interpretation begins with the calculation of the interval velocities, by computer system 2, from the rms velocities for the various horizons according to the well-known Dix equation:

$$v_{interval} = [(T_2 v^2_{rms2} - T_1 v^2_{rms1})/(T_2 - T_1)]^{1/2}$$

where $T_1$, $T_2$ correspond to the two-way times for a CDP at two horizons $H_1$, $H_2$, respectively, and where $v_{rms1}$, $v_{rms2}$ correspond to the rms velocities for the same CDP at horizons $H_1$, $H_2$, respectively.

Figure 8C:
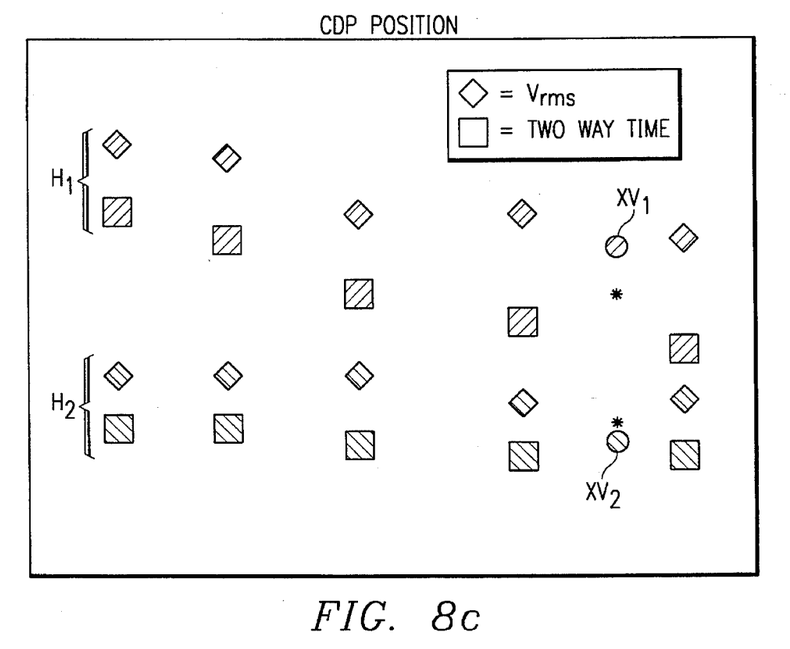

The cross-section display of two-way time versus interval velocity for each seismic line, in process 28, is similar to that illustrated in FIGS. 8a through 8c, except that the velocity axis is interval velocity rather than rms velocity. Interpretation of the interval velocity in process 28 is performed in the same manner as described hereinabove in process 24, namely by entering and moving interpreted velocity points by way of the open circle, based upon visualization of the cross-sectional display and any extrinsic data (check shots, well logs, core samples). This interpreting of interval velocities is done for each seismic line, at each horizon, in process 28.

Figure 10:
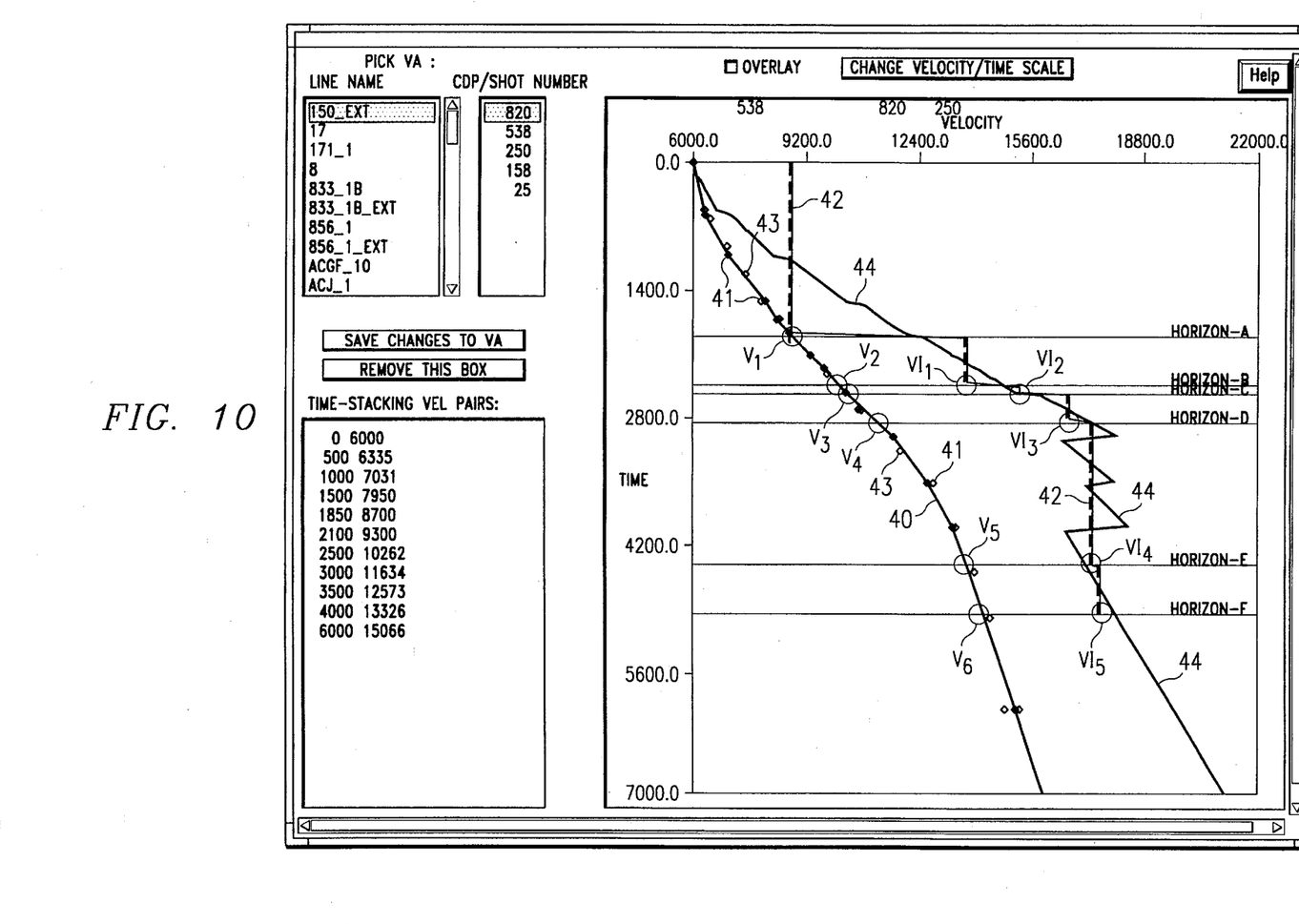

Upon completion of process 28, the interval velocity functions are edited for each CDP in process 30, according to the preferred embodiment of the invention. Referring to FIG. 10, the display window of the velocity functions for a selected CDP in an actual survey is illustrated. According to the preferred embodiment of the invention, in process 30 (and also during process 26 described above), each CDP velocity function display shows three velocity functions of two-way time: the rms velocity function 40, the interval velocity function 42 where the interval is defined as that between horizons, and the interval velocity function 44 where the interval is defined as the 50 msec preceding each two-way time.

As illustrated in FIG. 10, six horizons are present for this CDP, namely (in order of ascending two-way time) HORIZON-A through HORIZON-F. Dark solid diamonds 41 indicate the paired values of two-way time and rms velocity edited so that the rms velocity function matches the interpreted velocity values $V_1$ through $V_6$; these paired values are numerically displayed in the table "TIME-STACKING VEL PAIRS" in the lower-left corner of the display window of FIG. 10. Light solid diamonds 43 indicate the location of overlaying paired values of two-way time and rms velocity from a CDP adjacent to that for which the rms velocity function is displayed by dark solid diamonds 41; no interpolation is performed among these overlay values 43, in this example of the invention.

As shown in FIG. 10, interval velocity function 42 is a piecewise linear function of two-way time, which follows from the definition of interval velocity from the Dix equation noted above and its selected intervals between horizons. It should be noted that interval velocity function 42 is not present below the lowest horizon HORIZON-F in FIG. 10, as the interval between horizons is undefined thereat. Interval velocity function 44 is a function of two-way time where the intervals are defined as the most recent 50 msec of each two-way time value. These interval velocity functions 42, 44 provide additional control in accurately and coherently editing the rms velocity paired values 41.

As in the case of process 26 described hereinabove, interpreted interval velocities $IV_1$ through $IV_5$ indicate the location of interpreted interval velocities at particular horizons. These interpreted interval velocities are entered in process 28 described above, and as such correspond to interval velocity values determined by the human analyst based on visualization of the data, actual measurements (check shots, core samples, well logs, etc.), and the like. In process 30, similarly as in process 26 described above, the human analyst moves, deletes and adds paired values of rms velocity and two-way time (i.e., moves, deletes and adds points corresponding to dark solid diamonds 41) as necessary to correct both rms velocity function 40 and interval velocity function 42 so as to match the interpreted values $V_1$ through $V_6$, $VI_1$ through $VI_4$, respectively.

It should be noted that the paired values edited in process 30 are the paired values originally entered in process 22, and edited in process 26. As such, the same paired data values are used to derive not only the rms velocity function 40, but also the interval velocity functions 42, 44, so that the derived functions are consistent with one another.

As noted above, while processes 24, 26, 28, 30 are illustrated as sequential processes, the human analyst may find it useful to interactively travel among the cross-section and velocity function displays in determining the interpreted velocities and in editing the rms and interval velocity functions. In particular, the sequence of FIG. 2 is based on the assumption that it is easier to edit the velocity data to set the rms velocity function first for each of the CDPs prior to editing the interval velocity functions; however, the analyst may alternatively edit the data to make coherent only the interval velocity functions, or to set the interval velocity functions prior to setting the rms velocity functions. Furthermore, the human analyst may wish to examine one or more horizons in map view (as in FIG. 6) during the interpreting or editing functions; it is therefore preferred that the display windows allow the capability of so viewing the information in this manner.

Figure 11:
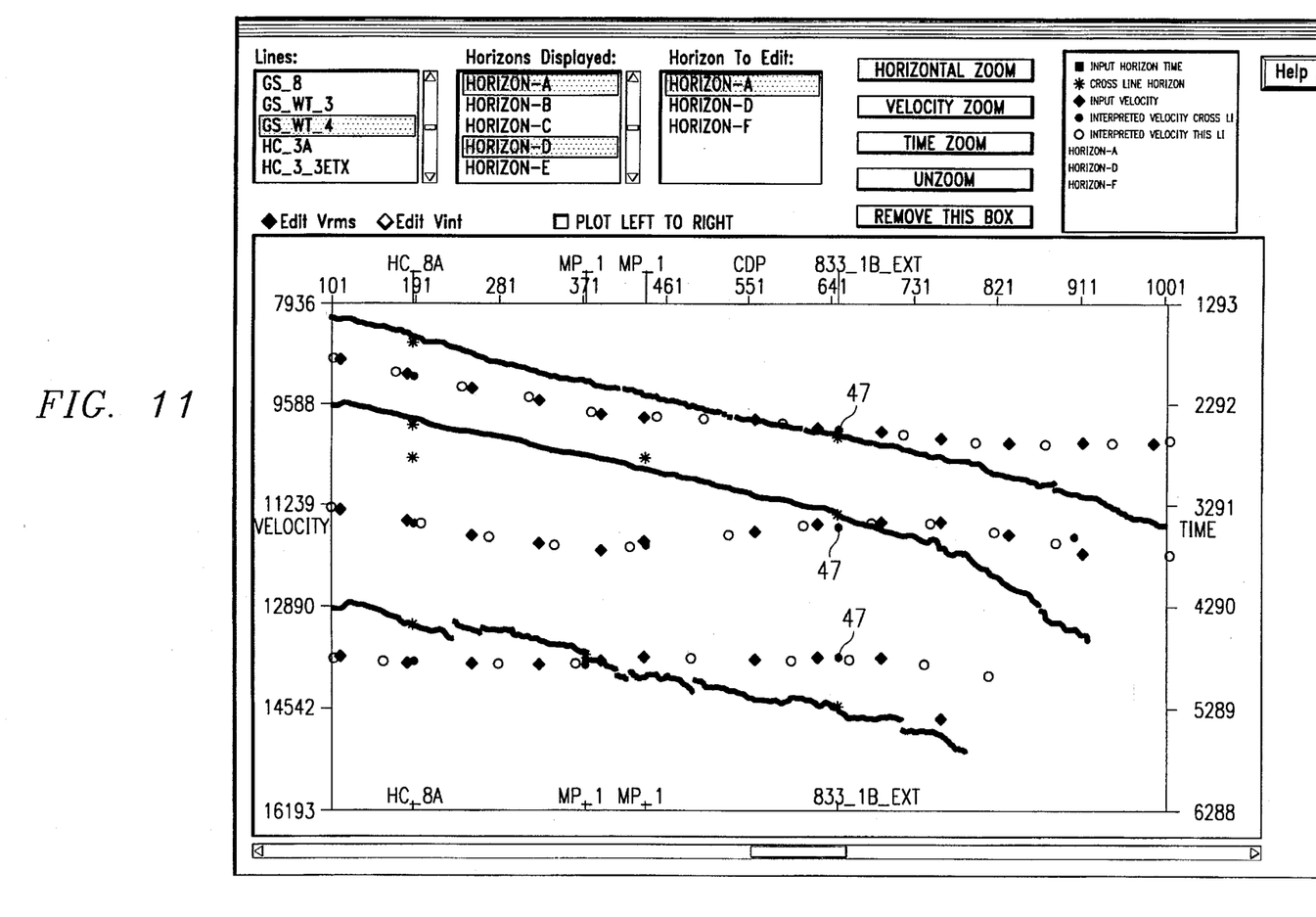
FIG. 11 is an illustration of displayed velocity and two way time for another set of exemplary horizons of data according to the preferred embodiment of the invention.

As a result of processes 24, 26, 28, 30, the velocity volume V will have a significant amount of interpreted velocities therewithin. FIG. 11 illustrates an example of the cross-sectional view of one of the seismic lines, for several horizons, upon completion of the interpreting and editing process noted herein. As illustrated in FIG. 11, the asterisks indicate posted two-way time values from crossing seismic lines; similarly, solid circles 47 in FIG. 11 indicate the values of interpreted velocities from crossing seismic lines. Accordingly, the cross-sectional view can aid in selecting interpreted velocities so as to result in a coherent velocity volume.

Upon completion of process 30, a velocity volume is defined to consist of velocity functions (velocity as a function of two-way time) for each of the CDPs in the survey. This velocity volume will have velocities that are more geologically reasonable and consistent than the process velocities, as they are edited and adjusted by a human analyst having reference to seismic data from crossing lines and adjacent CDPs, and as they can be based upon extrinsic data such as that obtained by well logs, check shots, core samples, and the like.

As noted above, upon completion of the editing and interpreting of velocity data as described herein relative to FIG. 2, the edited interpretation may be used as an input to a repetition of this process, where additional two-way time horizon data (process 20) or additional process velocity function data (process 22) are provided, or where additional extrinsic data from check shots or well logs is obtained which can assist in a new velocity interpretation. In this way, the results of the process of FIG. 2 according to the preferred embodiment of the invention is particularly well-suited to be updated and corrected as additional data from drilling or additional seismic surveys are obtained. In particular, the human analyst may be able to determine locations in the survey area for which data is unacceptably sparse to accurately define the velocity volume, so that additional survey activity may be performed and the edited interpretation of the velocity volume updated to provide a more accurate time-to-depth conversion.

The velocity volume developed at the completion of process 30 is then output, in process 32, into a file format consistent with a conventional time-to-depth conversion routine. The time-to-depth conversion is then performed, in process 33, by applying the velocity volume produced by the present method to stacked time-domain seismic data, such that the time-domain seismic data is converted into a depth map of the survey volume using a velocity volume having improved accuracy relative to the process velocities originally used. As a result, it is contemplated that an improved depth map of a three-dimensional volume is enabled by the present invention.

In addition, the present invention allows the editing of velocity functions in an interactive manner. This interactive computer system provides multiple views to the human analyst, thus facilitating the editing of the velocity functions for coherency among the seismic data in a way not feasible or practical according to prior techniques.

Furthermore, it should be evident from the foregoing description that the skill of a human analyst is used to an advantage at an early stage in the development of the velocity volume, rather than after the expenditure of large computer effort and cost in performing iterative depth migration via inversions, and other conventional data processing techniques. The present invention may also be implemented on a computer having the power and speed of a modern workstation, rather than requiring use of a supercomputer as do prior methods. As such, not only is computing cost reduced by the present invention, but the method may be implemented on desktop computers rather than only at large, remote computing centers, thus enabling the distribution of the interpretation function and reducing the turn-around time for accurate analysis.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to provide an acoustic velocity model for a portion of the earth corresponding to a seismic survey volume, using computer data representations of seismic signals corresponding to sensed acoustic energy reflected from sub-surface geologic features within the seismic survey volume, comprising the steps of:

loading, into a computer, horizon data corresponding to the seismic signals for a plurality of seismic shot lines within the seismic survey volume, in the form of survey location versus two-way time;

loading, into the computer, process velocity data corresponding to acoustic velocity as a function of two-way time for a plurality of survey locations;

operating the computer to display the horizon data and the process velocity data as a function of position along a first one of the plurality of seismic shot lines, in a cross-sectional orientation corresponding to a cross-section of the earth, and to display at least one interpreted velocity value for a second one of said plurality of seismic shot lines at a survey location at which the first and second ones of said plurality of seismic shot lines cross;

entering an interpreted velocity value into the computer for a selected two-way time horizon of the first one of the seismic shot lines;

operating the computer to display the process velocity data and the interpreted velocity value as a function of two-way time for a selected survey location of the first one of the plurality of seismic shot lines, by associating the interpreted velocity value with a two-way time corresponding to the selected two-way time horizon;

editing the process velocity data in such a manner as to create an edited process velocity function that matches the interpreted velocity value.

2. The method of claim 1, wherein each of said entering steps enters a plurality of interpreted velocity values.

3. The method of claim 2, wherein said steps of operating the computer to display the process velocity data and the interpreted velocity value and the step of editing the process velocity data are each repeated for a plurality of survey locations in the first and second ones of the plurality of seismic shot lines.

4. The method of claim 3, wherein said step of operating the computer to display the horizon data and the process velocity data as a function of two-way time, and said step of entering an interpreted velocity value, are repeated for a plurality of seismic shot lines.

5. The method of claim 2, wherein said step of operating the computer to display the horizon data and the process velocity data as a function of two-way time, and said step of entering an interpreted velocity value, are repeated for a plurality of seismic shot lines.

6. The method of claim 5, wherein said step of operating the computer to display the horizon data and the velocity data for the first one of the plurality of seismic data lines also displays a two-way time for the second one of said plurality of seismic shot lines for a survey location at which the first and second ones of said plurality of seismic shot lines cross.

7. The method of claim 6, wherein said step of operating the computer to display the horizon data and the process velocity data displays the horizon data for a plurality of two-way time horizons.

8. The method of claim 6, further comprising:

after said editing step, repeating said step of operating the computer to display the horizon data and the process velocity data for the second one of the plurality of seismic shot lines.

9. The method of claim 8, wherein said step of operating the computer to display the horizon data and the velocity data for the second one of the plurality of seismic shot lines also displays the interpreted velocity value for the first one of said plurality of seismic shot lines for a survey location at which the first and second ones of said plurality of seismic shot lines cross.

10. The method of claim 1, further comprising:

after said editing step, determining interval velocity functions from the edited velocity function.

11. The method claim 1, further comprising:

after said editing step, applying the edited velocity function to data corresponding to the seismic signals to produce a depth map of the seismic survey volume.

12. An apparatus for producing an acoustic velocity model for a portion of the earth corresponding to a seismic survey volume, using computer data representations of seismic signals corresponding to sensed acoustic energy reflected from sub-surface geologic features within the seismic survey volume, comprising:

a data storage device, for storing horizon data corresponding to the seismic signals for a plurality of seismic shot lines within the survey area, in the form of survey location versus two-way time, and for storing process velocity data corresponding to acoustic velocity as a function of two-way time for a plurality of survey locations;

a graphics display device;

an input device; and a computer, coupled to said data storage device, to said graphics display device, and to said input device, programmed in such a manner as to:

retrieve said horizon data and said velocity data from said data storage device;

receive inputs via said input device corresponding to an interpreted velocity value into the computer for selected horizons in first and second ones of the plurality of seismic shot lines;

display, on said graphics display device, the horizon data and the process velocity data as a function of two-way time, in cross-sectional orientation corresponding to a cross-section of the earth for the first one of the plurality of seismic shot lines and at least one interpreted velocity value for a second one of said plurality of seismic shot lines at a survey location at which the first and second ones of said plurality of seismic shot lines cross, and to display the process velocity data and at least one interpreted velocity value as a function of two-way time for a selected survey location of the first one of the plurality of seismic shot lines;

modify the process velocity data in such a manner as to create an edited velocity function that matches the interpreted velocity value, responsive to inputs from said input device;

store the edited velocity function in said data storage device.

13. The apparatus of claim 12, wherein said computer is a desktop workstation.

14. The apparatus of claim 12, wherein said data storage device comprises disk storage.

15. The apparatus of claim 12, wherein said computer is further programmed to receive inputs from said input device for selecting display of the horizon data and the velocity data as a function of two-way time in an cross-sectional orientation, or display of the velocity data and the interpreted velocity value as a function of two-way time for a selected survey location.

16. The apparatus of claim 15, wherein said computer is further programmed to receive inputs from said input device for selecting one of said plurality of seismic lines for display of the horizon data and the velocity data as a function of two-way time in an cross-sectional orientation.

17. The apparatus of claim 15, wherein said computer is further programmed to receive inputs from said input device for selecting one of said survey locations for display of the velocity data and the interpreted velocity value.

18. The apparatus of claim 12, wherein said computer is further programmed to determine interval velocity functions from the modified velocity data.

* * * * *